Patented Nov. 5, 1946

2,410,553

UNITED STATES PATENT OFFICE 2,410,553

MANUFACTURE OF ALKYLATED AROMATIC COMPOUNDS

Louis Schmerling, Riverside, and Vladimir N. Ipatieff, Chicago, Ill., assignors to Universal Oil Products Company, Chicago, Ill., a corporation of Delaware No Drawing. Application November 24, 1944, Serial No. 565,050

14 Claims. (Cl. 260—671)

This invention relates to reactions of ketones with aromatic compounds and particularly with aromatic hydrocarbons.

An object of this invention is to produce alkylated aromatic compounds by reacting an aromatic compound and a ketone in the presence of a catalyst.

Another object of this invention is the production of isopropyl benzene and tertiary-butylbenzene by reacting acetone and benzene in the presence of a zinc chloride catalyst.

One specific embodiment of the present invention comprises the treatment of a ketone having an α-hydrogen atom with an aromatic compound in the presence of a zinc chloride catalyst at a temperature sufficient to cause the formation of alkylated aromatic compounds.

A further embodiment of the present invention comprises the treatment of a ketone having hydrogen attached to a carbon atom adjacent to the carbonyl carbon atom and an alkylatable benzene hydrocarbon in the presence of a zinc chloride catalyst at a temperature of from about 150° to about 450° C.

Ketones utilizable in our process comprise aliphatic and cyclic ketones containing hydrogen attached to a carbon atom in alpha position to the carbonyl group. The aliphatic ketones include alkyl ketones and olefinic ketones, the latter including unsaturated condensation products of alkyl ketones having hydrogen attached to an alpha carbon atom. The process is particularly applicable to the treatment of acetone and its condensation product, mesityl oxide. The cyclic ketones utilizable in the process contain a cycloparaffin group or aryl group.

Aromatic compounds which are reacted with ketones as herein set forth include particularly aromatic hydrocarbons and halo-aromatic hydrocarbons. Thus, benzene, toluene, xylenes, propyl benzene, butyl benzene, and other alkylatable benzene hydrocarbons of higher molecular weight as well as polycyclic aromatic hydrocarbons and alkyl polycyclic aromatic hydrocarbons may be utilized in our process. Mono-halogenated aromatic hydrocarbons which are sometimes referred to as aryl halides and particularly aryl chlorides and aryl bromides are converted into alkylated aryl halides by treatment with ketones in the presence of a zinc chloride catalyst as herein set forth.

Although zinc chloride may be used as such to catalyze the process of our invention, it is preferable to support this catalytic material by a suitable carrier such as silica, diatomaceous earth, activated clay, alumina, etc. The catalyst may be used in the form of granules, shaped particles, or powder, although the granular material is generally preferred in certain continuous types of operation wherein the reacting aromatic compound and ketone are passed simultaneously through a heated reactor containing catalytic packing material. The process may also be carried out batchwise in suitable reactors capable of withstanding a pressure generally of not more than about 100 atmospheres. Addition to the reaction mixture of hydrogen and/or of hydrogen chloride is sometimes advantageous.

The production of alkylated aromatic hydrocarbons and alkylated halo-aromatics by the interaction of an aromatic compound with a ketone in the presence of a zinc chloride catalyst is unexpected, particularly since the prior art discloses the production of β-phenylisobutyl methyl ketone by interaction of benzene and mesityl oxide in the presence of aluminum chloride. When benzene and mesityl oxide were interacted according to the process of our invention in the presence of our zinc chloride catalyst, the reaction product contained tertiary-butylbenzene, isopropyl benzene, and acetic acid, but no β-phenylisobutyl methyl ketone. Other ketones and aromatic compounds react similarly in the presence of our catalyst to give alkylated and polyalkylated aromatic compounds.

The process of our invention and its commercial value are indicated further by the following examples which are not introduced with the intention of unduly limiting the broad scope of our invention.

Example I 30 grams of acetone, 80 grams of benzene, and 15 grams of a pelleted zinc chloride-alumina catalyst containing 25% by weight of zinc chloride were placed in a glass-lined autoclave, hydrogen was introduced to a pressure of 100 atmospheres and the reaction mixture was rotated and heated at 250° C. for four hours. After the autoclave had cooled to about 20° C., the products which were removed therefrom consisted of 98 grams of deep yellow liquid having the odor of acetic acid and 20 grams of used catalyst having a tan color. Distillation of the liquid product separated a mixture of acetic acid and mesityl oxide from about 18 grams of alkylated benzene hydrocarbons containing mono-isopropyl benzene, mono-tertiary-butylbenzene, and polyalkylated benzene hydrocarbons. The yield of mono-alkylated benzene hydrocarbons was about 40% of the theoretical based upon the amount of acetone charged while the yield of polyalkylated benzenes was about 32% of the theoretical.

In a similar run in which acetone alone was heated at 250° C. under hydrogen pressure in the presence of the zinc chloride catalyst, no alkyl benzenes were formed and the reaction product consisted of water, acetic acid, and high boiling condensation products consisting mainly of mesityl oxide, phorene, etc.

*Example-II*

30 grams of acetone, 80 grams of benzene, and 15 grams of zinc chloride-silica catalyst, the latter consisting of 25% by weight of zinc chloride deposited upon celite spheres, were placed in a glass-lined autoclave to which hydrogen was added to 100 atmospheres pressure. The charged autoclave was then rotated and heated at 300° C. for 4 hours. After the autoclave and contents had cooled to about 25° C., 93 grams of liquid product and 25 grams of used catalyst in the form of tan spheres were removed therefrom. The liquid product was washed with water before distillation. Neutralization of the washed water with caustic soda solution followed by evaporation yielded sodium acetate which was identified by its reaction with parabromophenacyl bromide which gave parabromophenacyl acetate melting at 84–85° C. Distillation of the washed liquid product gave the following fractions:

| Fraction No. | B. P., ° C. | Distillate, cc. | $n_D^{20}$ |
|---|---|---|---|
| 1 | 81–83 | 64 | |
| 2 | 83–147 | 5.2 | 1.4909 |
| 3 | 147–151 | 5.5 | 1.4877 |
| 4 | 151–160 | 5.2 | 1.4881 |
| 5 | 160–167 | 5.2 | 1.4898 |
| 6 | 167–175 | 2.5 | 1.4900 |
| 7 | 175–215 | 3.5 | 1.4905 |
| Residue | | 4.5 | |

Fractions 1 and 2 consisted mainly of unconverted benzene. Fractions 3 and 4 consisted chiefly of isopropyl-benzene and some tertiary-butylbenzene. Fractions 5 and 6 consisted chiefly of tertiary-butylbenzene. Fraction 7 and the residue contained polyalkylbenzene hydrocarbons including di-isopropylbenzene. Based upon the amount of acetone charged, the yield of mono-alkylbenzene hydrocarbons was about 55% of the theoretical while the yield of polyalkylbenzenes was about 34% of the theoretical.

*Example III*

In a run similar to that described in Example I, 30 grams of mesityl oxide, 79 grams of benzene, 15 grams of the zinc chloride-alumina catalyst were placed in an autoclave to which hydrogen was added to 100 atmospheres pressure and then heated at 250° C. for 4 hours. The 96 grams of reddish-brown liquid product which was recovered from this treatment contained acetic acid, tertiary-butylbenzene, and polyalkylated benzenes. The yield of tertiary-butylbenzene was about 26% of the theoretical based upon the amount of mesityl oxide charged while the yield of polyalkylated benzenes was about 40% of the theoretical.

The character of the process of the present invention and particularly its commercial value are evident from the preceding specification and numerical data presented.

We claim as our invention:

1. A process for producing alkylated aromatic compounds which comprises reacting a ketone having hydrogen attached to a carbon atom adjacent to the carbonyl group and an alkylatable aromatic compound selected from the group consisting of aromatic hydrocarbons and aryl halides in the presence of a zinc chloride catalyst.

2. A process for producing alkylated aromatic hydrocarbons which comprises reacting an alkylatable aromatic hydrocarbon and a ketone having hydrogen attached to a carbon atom adjacent to the carbonyl carbon atom in the presence of a zinc chloride catalyst.

3. A process for producing alkylated benzene hydrocarbons which comprises reacting an alkylatable benzene hydrocarbon and a ketone having hydrogen attached to a carbon atom adjacent to the carbonyl carbon atom in the presence of a zinc chloride catalyst.

4. A process for producing alkylated benzene hydrocarbons which comprises reacting an alkylatable benzene hydrocarbon and an aliphatic ketone having hydrogen attached to a carbon atom adjacent to the carbonyl carbon atom in the presence of a zinc chloride catalyst.

5. A process for producing alkylated benzene hydrocarbons which comprises reacting an alkylatable benzene hydrocarbon and an alkyl ketone having hydrogen attached to a carbon atom adjacent to the carbonyl carbon atom in the presence of a zinc chloride catalyst.

6. A process for producing alkylated benzene hydrocarbons which comprises reacting an alkylatable benzene hydrocarbon and an olefinic ketone having hydrogen attached to a carbon atom adjacent to the carbonyl carbon atom in the presence of a zinc chloride catalyst.

7. A process for producing alkylated benzene hydrocarbons which comprises reacting acetone and benzene in the presence of a zinc chloride catalyst.

8. A process for producing alkylated benzene hydrocarbons which comprises reacting mesityl oxide and benzene in the presence of a zinc chloride catalyst.

9. A process for producing alkylated benzene hydrocarbons which comprises reacting an alkylatable benzene hydrocarbon and an aliphatic ketone having hydrogen attached to a carbon atom adjacent to the carbonyl carbon atom at a temperature of from about 150° to about 450° C. and at a pressure of from substantially atmospheric to about 200 atmospheres in the presence of hydrogen and of a zinc chloride catalyst.

10. A process for producing alkylated benzene hydrocarbons which comprises reacting an alkylatable benzene hydrocarbon and an aliphatic ketone having hydrogen attached to a carbon atom adjacent to the carbonyl carbon atom at a temperature of from about 150° to about 450° C. and at a pressure of from substantially atmospheric to about 200 atmospheres in the presence of hydrogen and of a solid composite of zinc chloride and a carrier.

11. A process for producing alkylated benzene hydrocarbons which comprises reacting an alkylatable benzene hydrocarbon and an alkyl ketone having hydrogen attached to a carbon atom adjacent to the carbonyl carbon atom at a temperature of from about 150° to about 450° C. and at a pressure of from substantially atmospheric to about 200 atmospheres in the presence of hydrogen and of a solid composite of zinc chloride and a carrier.

12. A process for producing alkylated benzene hydrocarbons which comprises reacting an alkylatable benzene hydrocarbon and an olefinic ketone having hydrogen attached to a carbon atom adjacent to the carbonyl carbon atom at a temperature of from about 150° to about 450° C. and at a pressure of from substantially atmospheric to about 200 atmospheres in the presence of hydrogen and of a solid composite of zinc chloride and a carrier.

13. A process for producing alkylated benzene hydrocarbons which comprises reacting acetone and benzene at a temperature of from about 150° to about 450° C. and at a pressure of from substantially atmospheric to about 200 atmospheres in the presence of hydrogen and of a solid composite of zinc chloride and a carrier.

14. A process for producing alkylated benzene hydrocarbons which comprises reacting mesityl oxide and benzene at a temperature of from about 150° to about 450° C. and at a pressure of from substantially atmospheric to about 200 atmospheres in the presence of hydrogen and of a solid composite of zinc chloride and a carrier.

LOUIS SCHMERLING.
VLADIMIR N. IPATIEFF.